United States Patent [19]

Striplin

[11] 4,094,238
[45] June 13, 1978

[54] LETTUCE HARVESTER

[75] Inventor: Charles D. Striplin, Concord, Calif.

[73] Assignee: Striplin Machine & Engineering Company, Benecia, Calif.

[21] Appl. No.: 623,969

[22] Filed: Oct. 20, 1975

[51] Int. Cl.² ............................................. A23N 15/00
[52] U.S. Cl. ........................................ 99/643; 171/38
[58] Field of Search ............... 56/327 R; 171/18, 38, 171/61; 99/546, 635, 637, 642, 643; 83/436, 492, 500, 694

[56] References Cited

U.S. PATENT DOCUMENTS

| 3,302,727 | 2/1967 | Ray | 99/643 |
|---|---|---|---|
| 3,503,196 | 3/1970 | Jarrett | 56/327 R |
| 3,537,495 | 11/1970 | Pearson | 99/637 |
| 3,589,117 | 6/1971 | Wadsworth | 171/61 |
| 3,821,987 | 7/1974 | Shepardson et al. | 171/61 |
| 3,827,503 | 8/1974 | Hansen | 171/38 |

Primary Examiner—Harvey C. Hornsby
Assistant Examiner—Robert Pous
Attorney, Agent, or Firm—Robert G. Slick

[57] ABSTRACT

A lettuce harvester is provided having a positive means for engaging the stems of lettuce to be trimmed whereby the trim cut is caused to take place at right angles to the stem and the lettuce is left ready for packing.

1 Claim, 5 Drawing Figures

LETTUCE HARVESTER

SUMMARY OF THE INVENTION

Various harvesters for head lettuce and similar vegetables have been proposed which have some means for determining the maturity of the heads and picking only those heads which are mature and leaving immature heads for future harvesting.

Such maturity testers work on various principles such as the mechanical testers which measure the firmness of the head, either from the top or the sides and others which measure the density using gamma or X-rays. In each instance, after a head has been selected for picking, it is cut off close to the ground and in a subsequent operation, the heads are passed through a rotary knife to sever the root portion, leaving a neat, trimmed head suitable for immediate packaging.

Since lettuce is ordinarily packed in crates for shipment on a moving platform which forms part of the lettuce harvesting machine, it is obvious that it is very important to provide a means on the harvester itself for making an accurate trim of the lettuce heads without wasting any of the lettuce.

The severed lettuce heads pass over guage wheels and are pushed into the guage wheels and then the rotary knife by a crowder belt, and frequently, particularly if the knives are dull, the movement of the crowder belt tilts the head so that instead of neatly severing the stem at the base of the head, the stem of the tilted head will be cut at an angle or the knife will cut into the head itself so that the head is destroyed or at least cannot be packed as a fancy grade of lettuce.

In accordance with the present invention, the above difficulties are obviated by providing a rotating toothed blade opposite the rotary knife so that the teeth impale the stem just below the point at which the stem is to be cut whereby the stem is positively propelled into the rotating knife resulting in a neat cut. Although a specially designed impaling device could be provided, a conventional rotary saw blade serves this purpose very well.

DESCRIPTION OF THE PREFERRED EMBODIMENTS

Figures 1, 2:
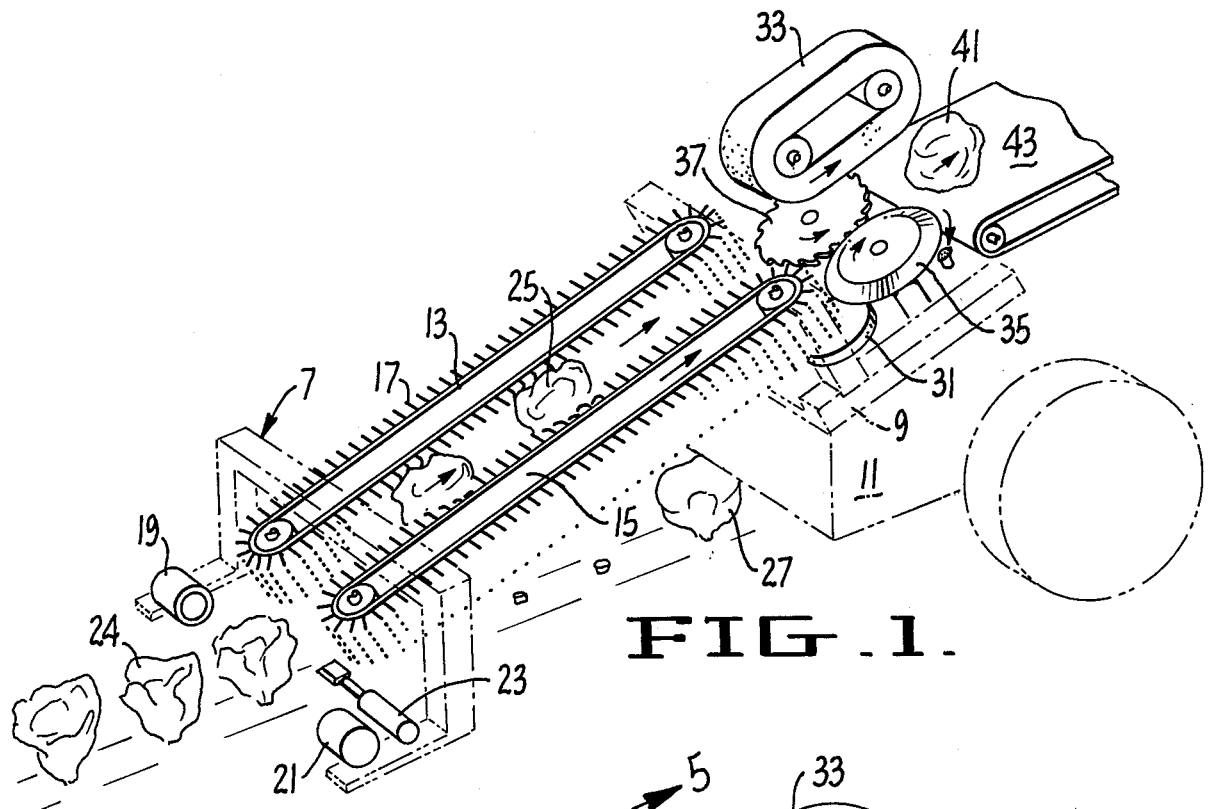
FIG. 1 is a perspective view of a portion of a lettuce harvesting machine embodying the present invention.
FIG. 2 is an enlarged side section of the stem trimming portion of the machine.

Referring to the drawings by reference characters, the lettuce harvester proper is carried on frame members generally designated 7 and 9 mounted on a propulsion machine 11. It will be understood that lettuce is ordinarily planted in double rows so that a practical machine covers two rows at a time, but for the sake of simplicity, in FIG. 1 only a single row device is shown, i.e. one-half of the usual practical machine. Mounted over each row of lettuce is a pair of belts 13 and 15 which are inclined at an angle to the horizontal. Both have a series of rubber fingers 17 thereon and the belts are driven together in the direction shown by the arrows at substantially the speed at which the machine advances in such a manner that the lettuce will be gripped lightly between the rubber fingers.

Just in front of the belts is an X-ray emitter 19 and a detector 21, the latter being coupled to a cut-off knife 23. The device is propelled forward over the rows of lettuce heads 24 and when heads of a desired density are encountered, the information is stored momentarily and used to actuate the knife 23 which severs a selected head substantially at ground level.

As has been previously mentioned, the rubber fingers grip the heads lightly and any heads which are severed, as at 25, are propelled upwardly between the belts, however, heads 27 which are of insufficient density to trip the mechanism, or are of too great a density, remain in the ground and pass out between the fingers undamaged for subsequent harvest.

Figure 3:
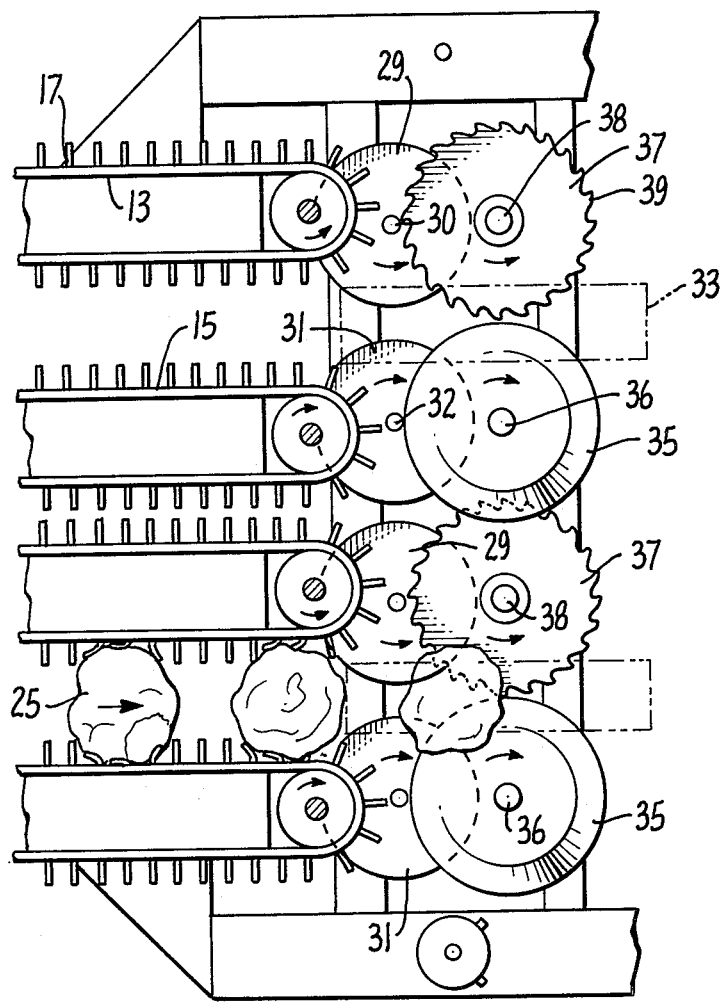
FIG. 3 is a plan view on the line 3—3 of FIG. 2.

At the terminal end of the belts, as can best be seen in FIG. 3, the heads pass over the guage wheels 29 and 31 mounted on shafts 30 and 32. These wheels are separated by a sufficient distance so that the stem will pass between them and the bottom of the plant is pushed against the guage wheels by means of a crowder belt 33. The crowder belt 33 is ordinarily made of a very soft, spongy rubber and is driven in synchronism with the guage wheels so that the head is propelled forward with the bottom of the head pressed firmly against the guage wheels, the spongy crowder belt 33 allowing for substantial variations in the size of heads.

As the heads leave the guage rolls 29 and 31, they encounter the rotary knife 35 mounted on shaft 36. With the structure thus far described, there is always the danger of the head tilting and the cut may be made at an angle or even into the head proper. However, according to the present invention, impaling blade 37 which is mounted on shaft 38 now engages the head substantially even with the cutting blade so that a clean, square cut is made at the base of the head. The impaling blade 37 has sharp teeth 39 inclined in the direction of rotation. A conventional saw blade is suitable for the purpose.

The heads 41 now leave the cutter on a belt 43 for subsequent operations such as the removal of loose leaves, hand trimming, wrapping and the like.

Figure 4:
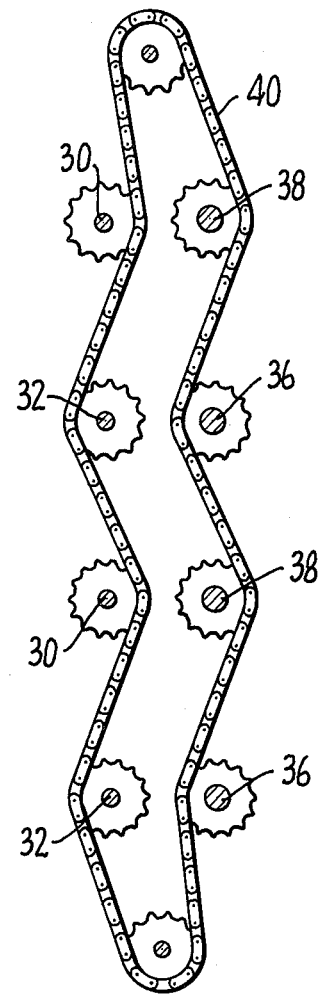
FIG. 4 is a similar plan view on the line 4—4 of FIG. 2.
Figure 5:
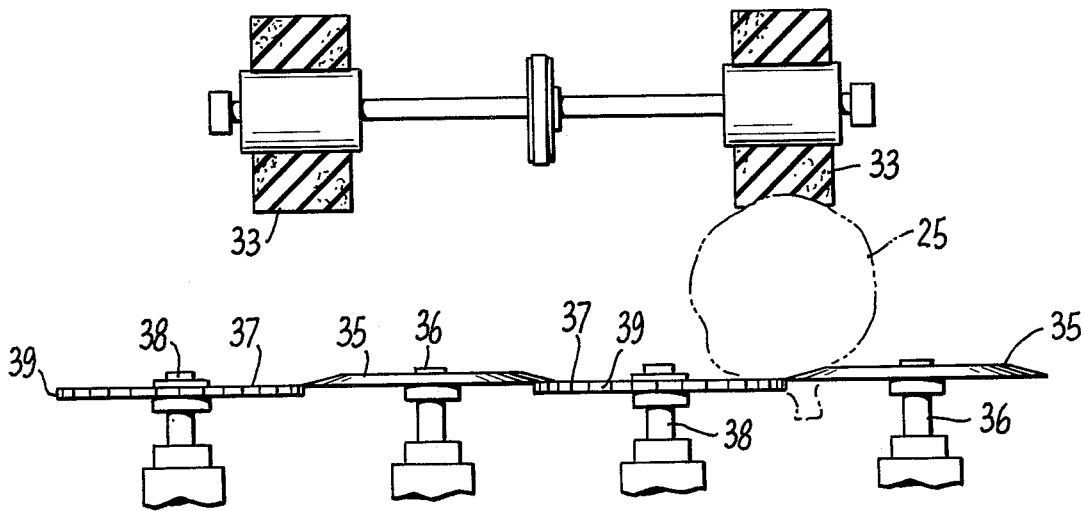
FIG. 5 is an end view of the cutting operation generally on the line 5—5 of FIG. 2.

The shafts 30 and 32 carrying the guage plates, shaft 36 carrying the knives and shaft 39 carrying the impaling blades are driven in synchronism and in the proper directions by means of a chain 40 as is shown in FIG. 4 from a power source, not shown.

It is believed apparent that I have provided a trimming device for a lettuce harvesting machine which occupies little space and insures accurate results and can be mounted on the machine proper so that it is fully automatic in operation and leaves a properly trimmed head, ready for packaging.

I claim:

1. A lettuce trimming machine for trimming the stem of a lettuce head substantially even with the bottom of the head comprising in combination:
   a. a pair of counterrotating flat guage wheels separated by about the width of a lettuce stem,
   b. a crowder belt mounted over said guage wheels,
   c. means for rotating said guage wheels and said crowder belt in synchronism whereby a lettuce head is propelled forward with the bottom of the head pressed firmly against said guage wheels,
   d. a rotary cutting knife mounted adjacent said guage wheels, e. an impaling blade mounted for rotation substantially even the said rotary cutting knife, said impaling blade having sharp teeth inclined in the direction of rotation, f. means for rotating said knife and said blade whereby, g. the teeth of said blade engage and impale the stem of a head of lettuce and positively force it into said knife.

* * * * *